(12) United States Patent
Cavicchia et al.

(10) Patent No.: US 10,596,615 B2
(45) Date of Patent: Mar. 24, 2020

(54) BENDING PRESS AND/OR FEEDING DEVICE FOR A BENDING PRESS WITH A BENDING TOOL TRANSFER DEVICE

(71) Applicant: TRUMPF Maschinen Austria GmbH & Co. KG., Pasching (AT)

(72) Inventors: Luigi Cavicchia, Trofarello (IT); Roberto Veronese, Chieri (IT); Giovanni Vidotto, Chieri (IT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 392 days.

(21) Appl. No.: 15/526,387

(22) PCT Filed: Nov. 12, 2015

(86) PCT No.: PCT/AT2015/050287
§ 371 (c)(1),
(2) Date: May 12, 2017

(87) PCT Pub. No.: WO2016/074011
PCT Pub. Date: May 19, 2016

(65) Prior Publication Data
US 2017/0320123 A1    Nov. 9, 2017

(30) Foreign Application Priority Data

Nov. 12, 2014 (AT) .............................. A50827/2014

(51) Int. Cl.
| | |
|---|---|
| *B21D 37/04* | (2006.01) |
| *B23Q 3/155* | (2006.01) |
| *B21D 5/02* | (2006.01) |

(52) U.S. Cl.
CPC .......... *B21D 37/04* (2013.01); *B21D 5/0236* (2013.01); *B21D 5/0254* (2013.01);
(Continued)

(58) Field of Classification Search
CPC ...... B21D 37/04; B21D 37/14; B21D 37/145; B21D 5/0236; B21D 37/147
(Continued)

(56) References Cited

U.S. PATENT DOCUMENTS

| 4,089,198 A | 5/1978 | Amano et al. |
| 4,449,907 A | 5/1984 | Yonezawa et al. |

(Continued)

FOREIGN PATENT DOCUMENTS

| AT | 516 624 A4 | 7/2016 |
| CN | 1402657 A | 3/2003 |

(Continued)

OTHER PUBLICATIONS

Letter of Austrian Patent Attorney to European Patent Office in PCT/AT2015/050286, dated Sep. 9, 2016.
(Continued)

*Primary Examiner* — Adam J Eiseman
*Assistant Examiner* — Bobby Yeonjin Kim
(74) *Attorney, Agent, or Firm* — Collard & Roe, P.C.

(57) ABSTRACT

The invention relates to a bending press (1) and/or feeding device (2) for feeding a bending press (1) with bending tools (5, 6), comprising:
at least one tool holder (3, 4; 13, 14) with a rail (7) comprising an inner profile (8) for receiving and displacing a bending tool (5, 6); and
at least one transfer device (15) which can be driven by a drive (21) for displacing a bending tool (5, 6) inside the tool holder (3, 4; 13, 14) and/or between the tool holder (13, 14) of the feeding device (2) and a tool holder (3, 4) of a bending press (1),
and the transfer device (15) comprises a releasable coupling (18) for connecting a bending tool (5, 6), said transfer device (15) being guided in the rail (7) of the tool holder (3, 4; 13,
(Continued)

Figure 10:
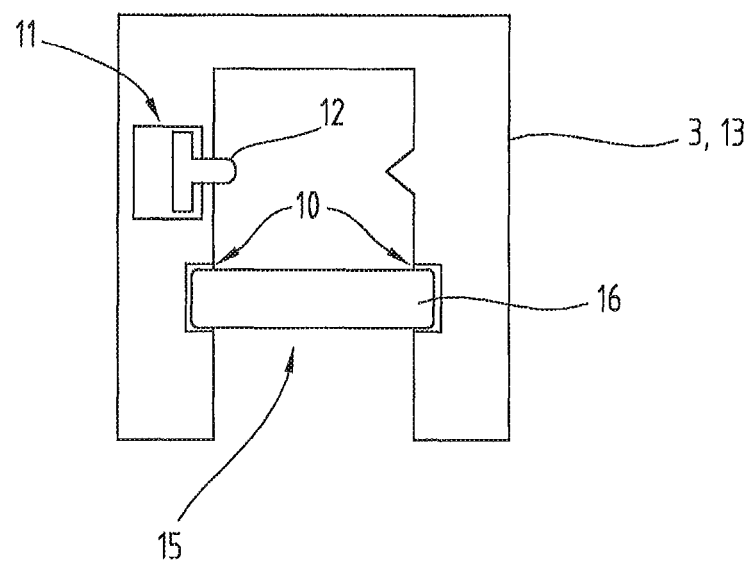

14) and the active area of the coupling (18) is arranged at least partially inside the rail (7).

32 Claims, 8 Drawing Sheets

(52) U.S. Cl.
CPC ......... *B21D 5/0281* (2013.01); *B23Q 3/1556* (2013.01); *Y10T 483/1731* (2015.01)

(58) Field of Classification Search
USPC .................................. 72/481.1, 481.2, 482.8
See application file for complete search history.

(56) References Cited

U.S. PATENT DOCUMENTS

| | | | | |
|---|---|---|---|---|
| 5,121,623 | A * | 6/1992 | Brzezniak | B21D 43/057 72/362 |
| 5,168,745 | A | 12/1992 | Miyagawa et al. | |
| 6,024,681 | A | 2/2000 | Latten et al. | |
| 7,168,286 | B1 * | 1/2007 | Pelech | B21D 5/0209 72/389.3 |
| 8,752,410 | B2 * | 6/2014 | Rogers | B21D 5/0209 72/413 |
| 10,144,049 | B2 * | 12/2018 | Jansen | B21D 5/0218 |
| 10,350,661 | B2 * | 7/2019 | Denkmeier | B21D 5/0254 |
| 2003/0005744 | A1 | 1/2003 | Gasparini | |
| 2004/0035178 | A1 | 2/2004 | Matsumoto et al. | |
| 2008/0043238 | A1 | 2/2008 | Bruggink | |
| 2009/0139296 | A1 * | 6/2009 | McCauley | B21D 5/0209 72/482.2 |
| 2013/0327104 | A1 * | 12/2013 | Haselboeck | B21D 5/0254 72/21.3 |
| 2015/0174633 | A1 * | 6/2015 | Sato | B21D 5/004 483/1 |
| 2017/0165734 | A1 * | 6/2017 | Denkmeier | B21D 5/0254 |
| 2018/0193896 | A1 | 7/2018 | Haselboeck et al. | |
| 2018/0304331 | A1 | 10/2018 | Cavicchia et al. | |

FOREIGN PATENT DOCUMENTS

| | | |
|---|---|---|
| CN | 1455710 A | 11/2003 |
| CN | 103278184 A | 9/2013 |
| CN | 104105555 A | 10/2014 |
| DE | 28 44 867 A | 4/1980 |
| DE | 33 26 067 A1 | 1/1985 |
| DE | 35 46 876 C2 | 7/1997 |
| EP | 0 310 145 A2 | 4/1989 |
| EP | 2 719 476 A1 | 4/2014 |
| EP | 3 338 906 A1 | 6/2018 |
| EP | 3 354 363 A1 | 8/2018 |
| FR | 2 317 027 A1 | 2/1977 |
| JP | S57-181725 A | 11/1982 |
| JP | S60-244426 A | 12/1985 |
| JP | S62-057717 A | 3/1987 |
| JP | H02-268922 A | 11/1990 |
| JP | H03-18924 U | 2/1991 |
| JP | H05-84414 U | 11/1993 |
| JP | H07-116734 A | 5/1995 |
| JP | H10-230399 A | 9/1998 |
| JP | 2001150032 A | 6/2001 |
| JP | 2003-211223 A | 7/2003 |
| JP | 2004358533 A | 12/2004 |
| JP | 2013-173172 A | 9/2013 |
| WO | 2012/083332 A1 | 6/2012 |
| WO | 2016/109862 A1 | 7/2016 |
| WO | 2017/004649 A1 | 1/2017 |
| WO | 2017/152207 A1 | 9/2017 |
| WO | 2018/145137 A1 | 8/2018 |

OTHER PUBLICATIONS

International Search Report of PCT/AT2015/050286, dated Mar. 29, 2016.
Letter of Austrian Patent Attorney to European Patent Office in PCT/AT2015/050287, dated Sep. 9, 2016.
Office Action in Japanese Patent Application No. 2017-525027 dated Jul. 30, 2019.

* cited by examiner

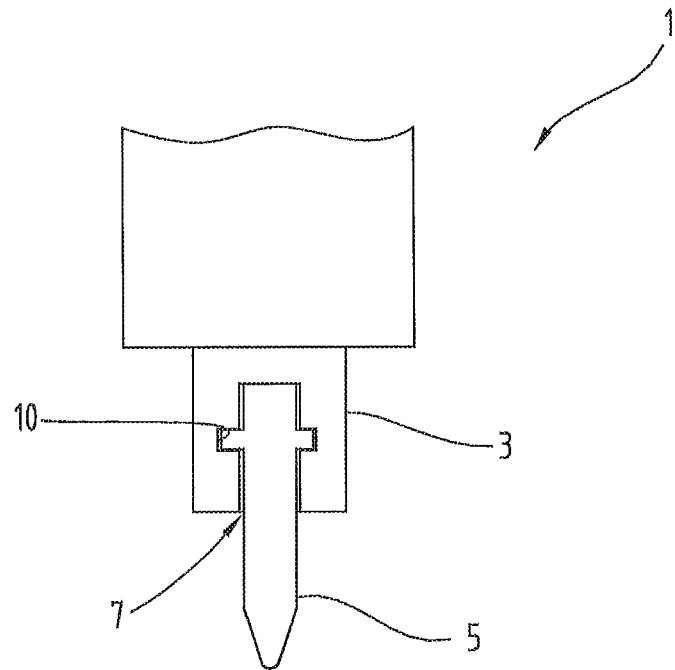
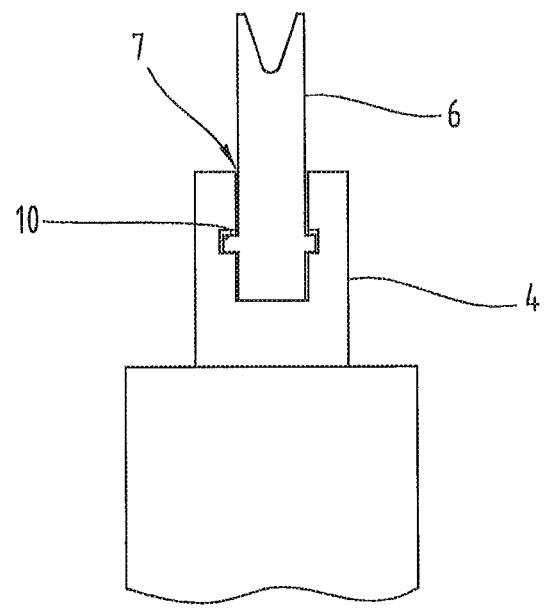

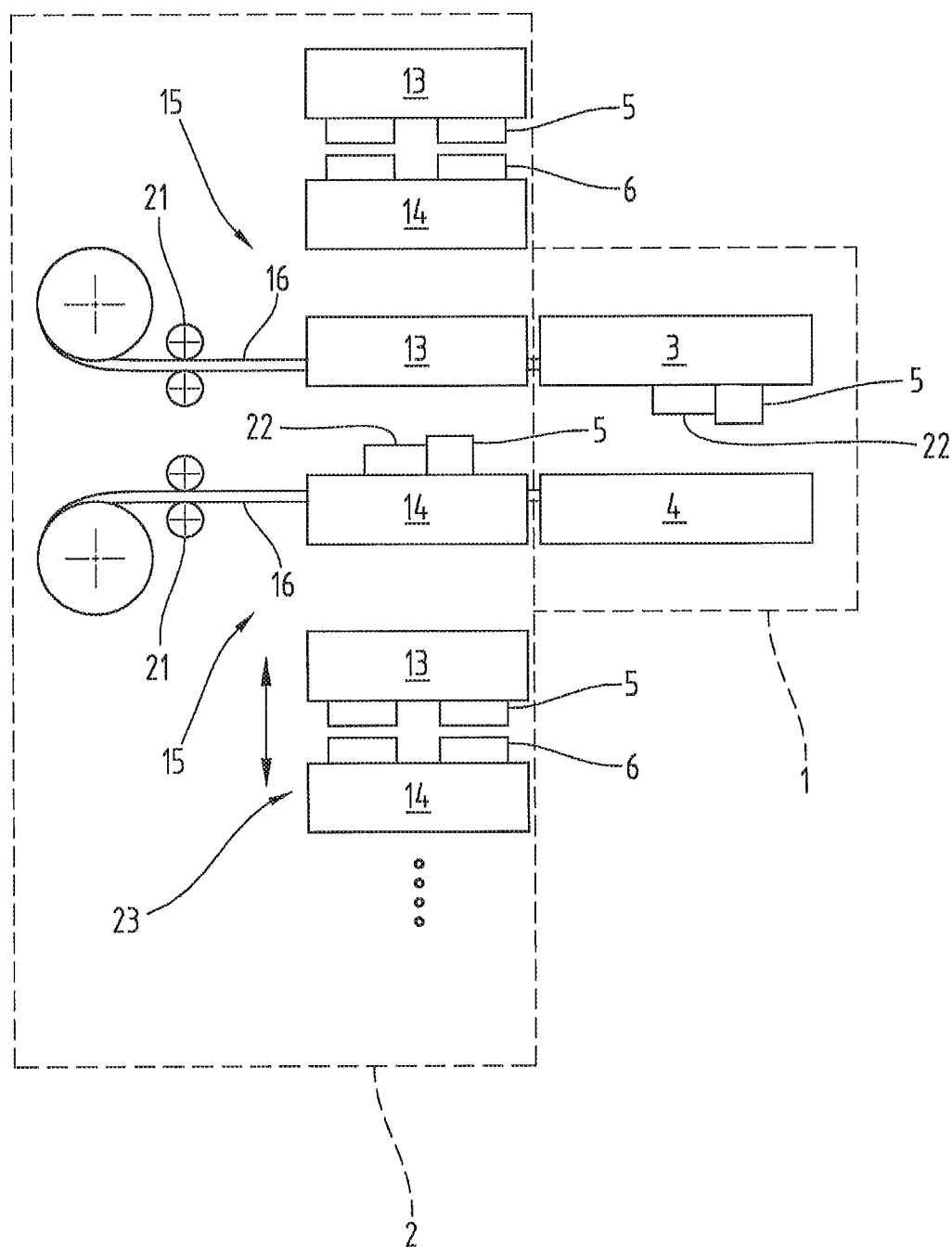

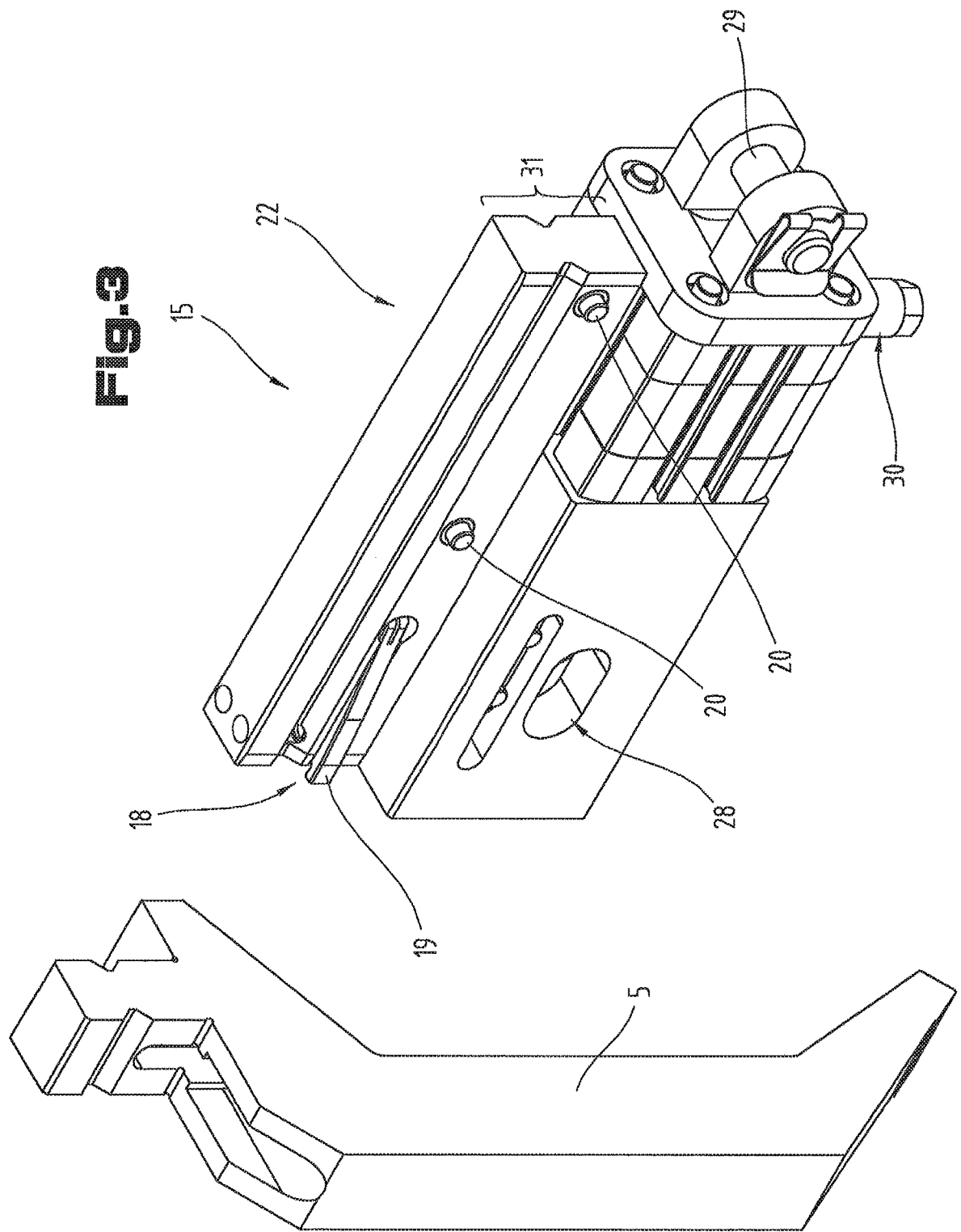

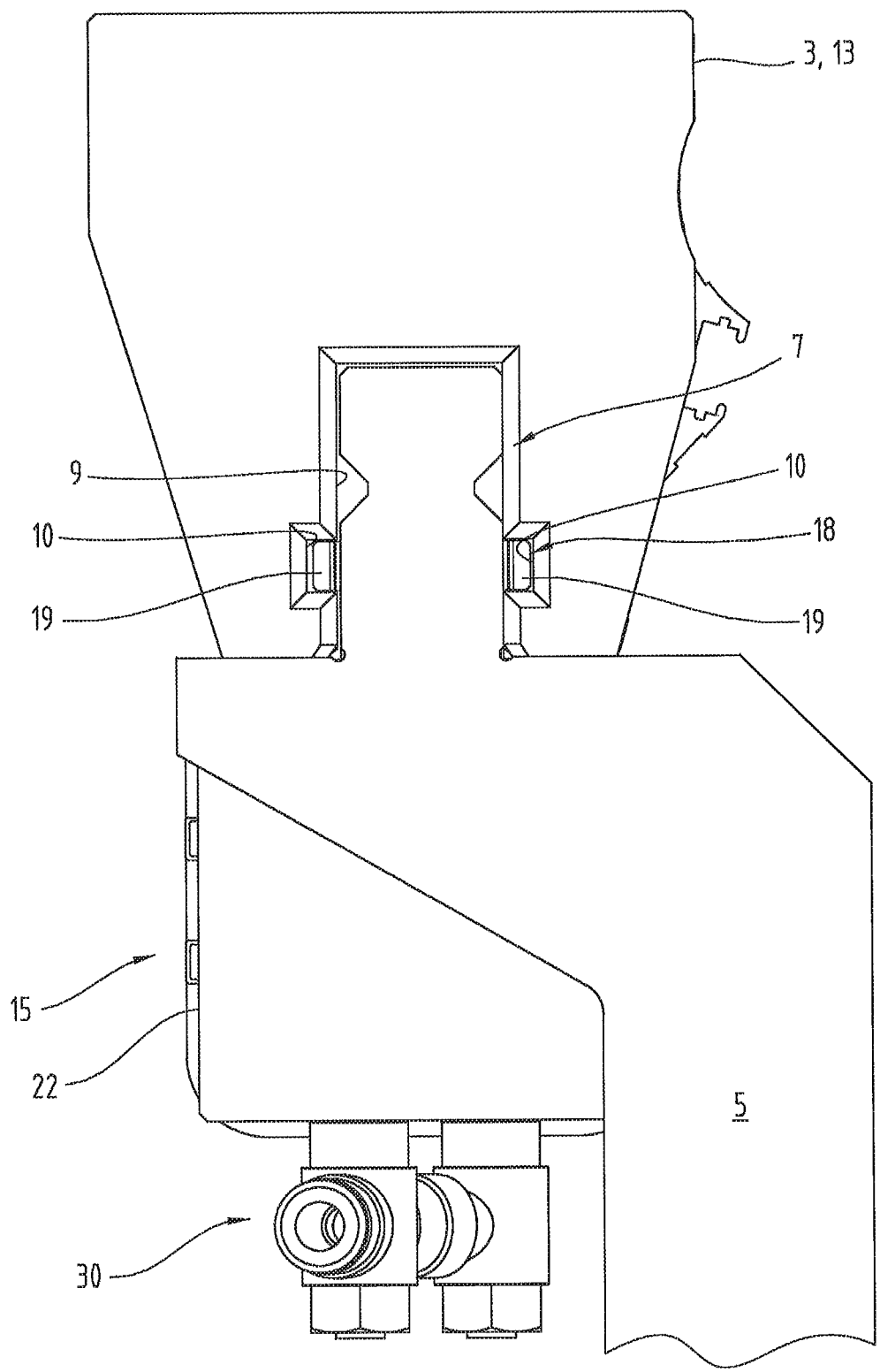

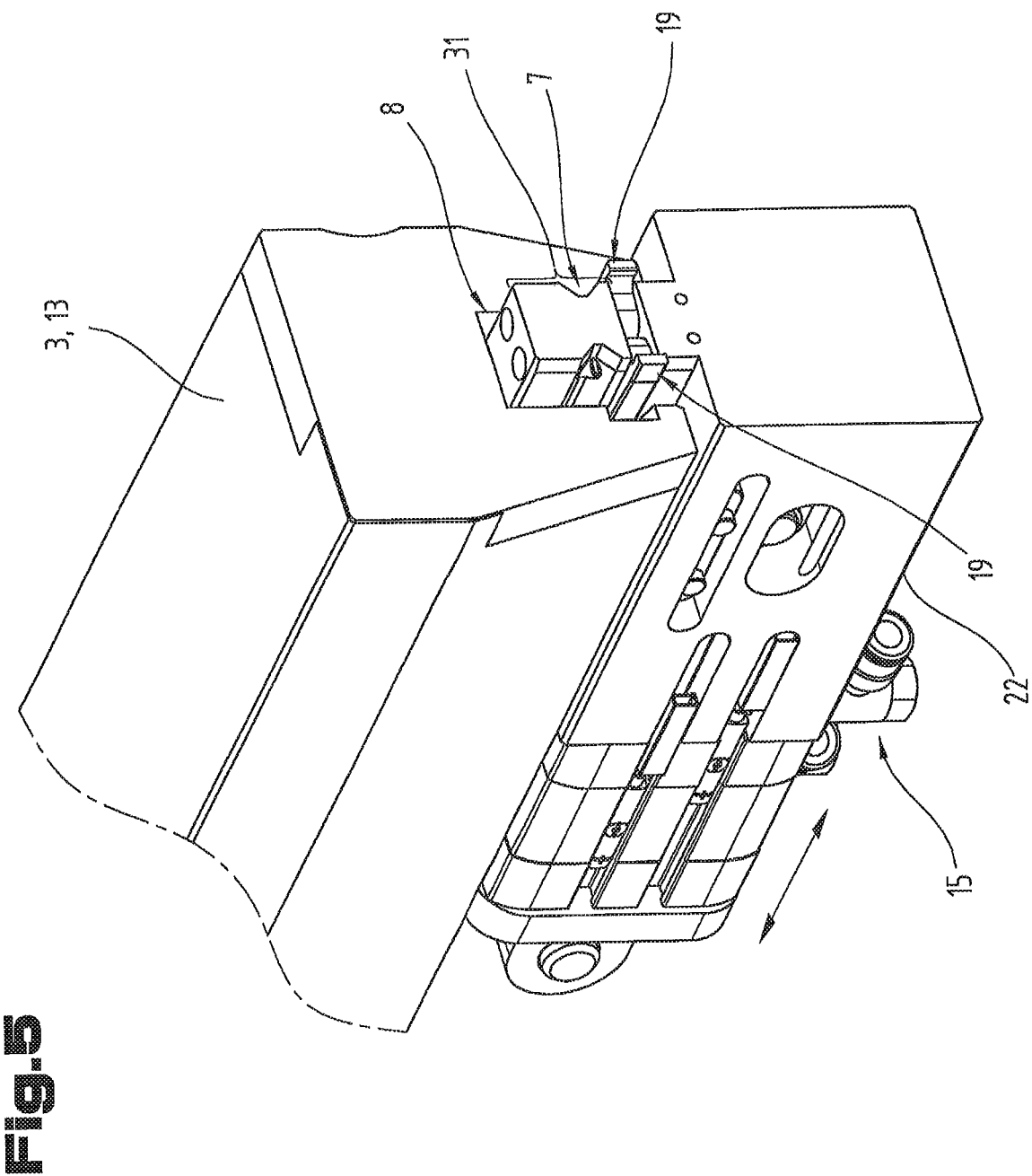

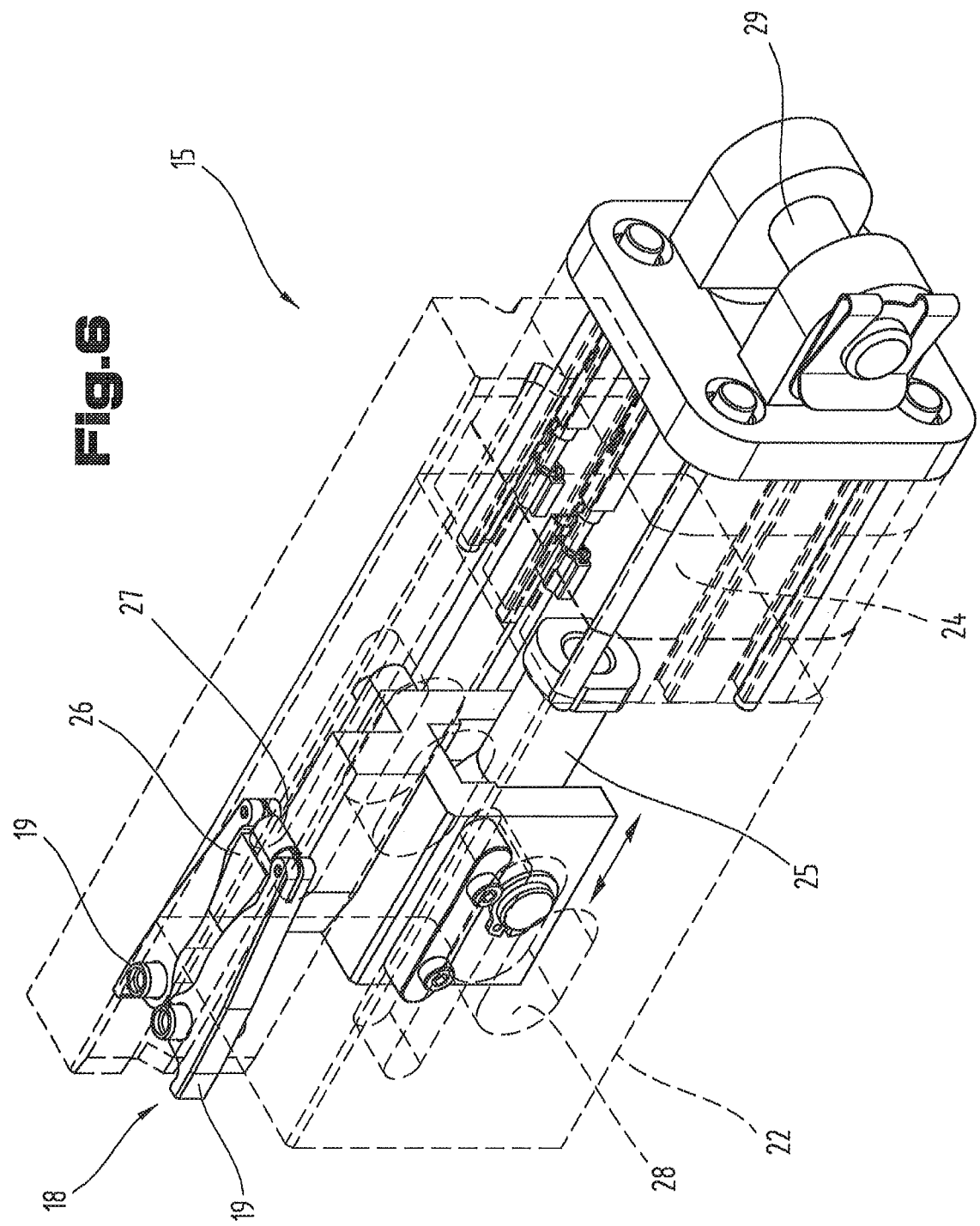

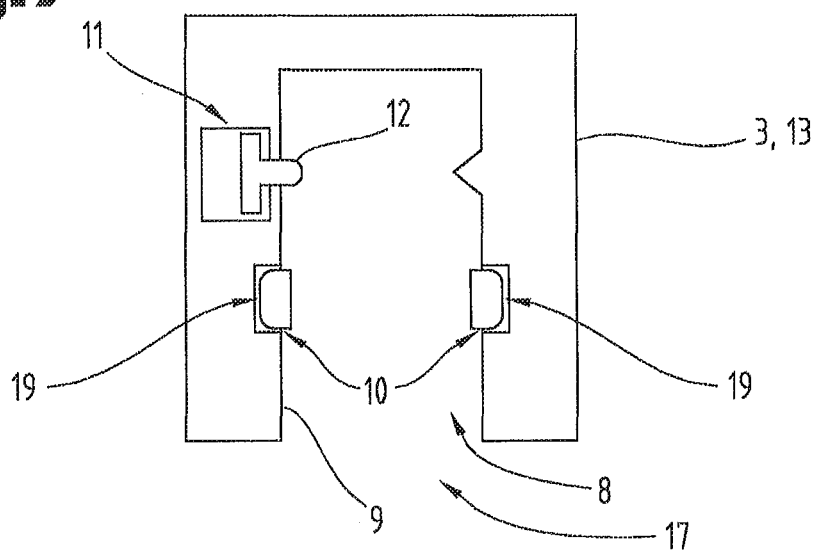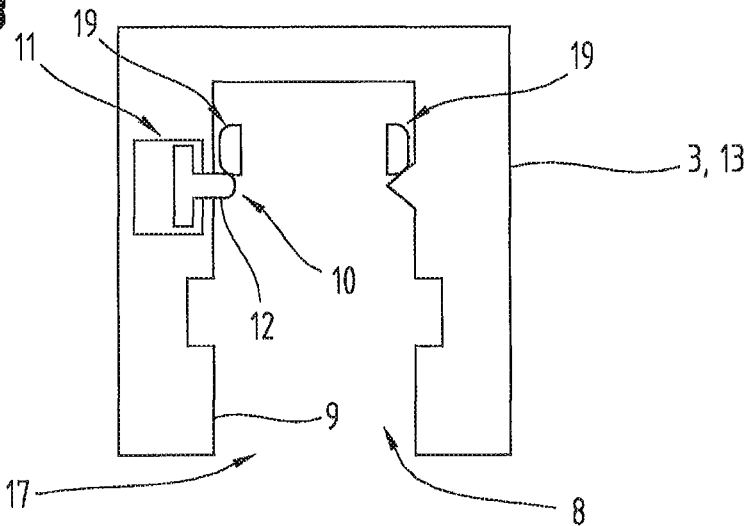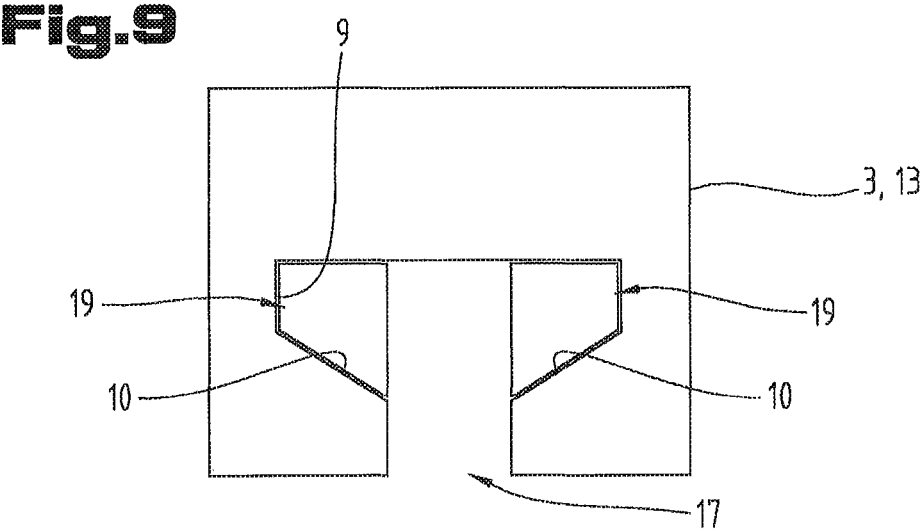

BENDING PRESS AND/OR FEEDING DEVICE FOR A BENDING PRESS WITH A BENDING TOOL TRANSFER DEVICE

CROSS REFERENCE TO RELATED APPLICATIONS

This application is the National Stage of PCT/AT2015/050287 filed on Nov. 12, 2015, which claims priority under 35 U.S.C. § 119 of Austrian Application No. A50827/2014 filed on Nov. 12, 2014, the disclosure of which is incorporated by reference. The international application under PCT article 21(2) was not published in English.

The invention relates to a bending press and/or feeding device and a method for setting up a bending press with bending tools and/or for changing one or more bending tools inserted in a bending press using a feeding device. The invention further relates to a bending tool transfer device.

Automation and the reduction of cycle times are important aspects in connection with bending operations carried out on different workpieces to be formed. One approach to achieving these aims is to automate the process of changing the bending tools inserted in a bending press using a tool changer provided separately for this purpose.

The most relevant prior art is JPH0584414U. This publication discloses a tool changer comprising a tool magazine made up of a number of circulating tool holders. A tool set comprising an upper tool and lower tool is held in every tool holder. In order to transfer a tool from the tool magazine to the bending press, the corresponding tool holder is moved to a specific position and moves a driven chain out. A shuttle attached to the front end of the chain has a mechanical docking device or coupling which is docked on the tool and pushes it into the bending press. The coupling comprises a projection which moves into an orifice of the tool. The projection is anchored in the tool orifice by means of ball bearings pushed outwards.

In JPH0584414U, separate chains with co-operating docking devices are provided for the upper and lower tool respectively. The chain guide and hence also the chain and shuttle extend entirely outside of the tool holder for both the lower and upper tool. Such a construction is complex and expensive, not least in terms of guiding the chain. It is very difficult or even impossible to retro-fit existing machines with the system. The chain guide is susceptible to dirt and occupies an excessive amount of space precisely in the area which needs to be accessible and free of obstacles when it comes to optimum operation and positioning of the workpiece.

A major disadvantage of this prior art specifically resides in the fact that the docking device or coupling of the shuttle is exposed and susceptible to external influences to a particularly high degree. This can lead to the coupling being damaged or incapable of functioning due to excessive dirt.

DE3326067A1 discloses a mold changing apparatus for molding machines, in particular injection casting machines. The pairs of mold halves are moved in and out of the injection casting machine on so-called roller carriages or roller transfer devices. The pairs of mold halves are transferred from the roller carriages onto the roller transfer devices (and vice versa) by means of a pull-push device. The pull-push device comprises a drive and a steel chain which can be set in a pushing-pulling motion by means of the drive. A hook is provided on the front end of the steel chain for coupling with the pair of mold halves. This construction is very different from a bending press; implementing this system in a bending press would not only be very complex but would effectively require a totally different design of the bending press.

JPS57181725A discloses an automatic tool changing device for a bending press. A tool storage is provided in the form of a drum of a larger diameter and a drum of smaller diameter. In order to set up the bending press with a specific tool, the drum is firstly moved into a corresponding rotational position and the selected tool is then conveyed into the bending press by means of a carriage along a guide separately provided for the latter. The cumbersome carriage carrying or holding the tool moves between the upper and lower tool holders. A driven chain is also used as a pull-push device in this instance. Here too, the disposition of the guide system is impractical. If providing displaceable back gauges, the options are severely limited due to lack of space and there is a risk of collisions. Due to the fact that the guides are difficult to access, fitting, maintenance and repairs are very complicated. It is not possible to retro-fit existing systems with a tool changing system.

JPS60244426A discloses a tool changer for a bending machine but contains no teaching as to the detailed construction of the tool changer.

What has proved to be problematic with the prior art in terms of a tool positioning or tool changing system is coupling a bending tool with the transfer device, e.g. with a chain and/or a shuttle. The exposed mounting of the coupling of the transfer device known from the prior art leads to damage due to collisions with other components or workpieces and to rapid soiling, to the degree that the coupling can even be rendered incapable of functioning. Another disadvantage is the complex and expensive construction needed to guide the transfer device incorporating the coupling and the bending tools. The partially exposed mounting of the chain and shuttle guides requires a lot of space and is vulnerable to external influences, such as dirt, impacts and collisions with other movable components, e.g. stops, sensors, etc. Particularly problematic is the fact that existing systems cannot be used in conjunction with the tool changers known from the prior art or would require complicated remodeling to make this possible.

The objective of the invention is to propose a bending press and/or a feeding device by means of which the problems known from the prior art can be solved and which in particular is characterized by a space-saving construction enabling existing bending presses and machines to be retrofitted. The transfer device and the coupling disposed on it should extend between the bending press and feeding device with as much protection as possible and shielded from dirt and other external influences. Maintenance, repair and replacement should be totally straightforward.

This objective is achieved by means of a bending press and/or feeding device of the type outlined above due to the fact that the transfer device is guided in the rail of the tool holder and the active area of the coupling lies at least partially inside the rail.

As a result of this feature, not only is the transfer device reliably guided, the process of coupling with the bending tool takes place in the immediate area of the rail in which the bending tool is guided, which is therefore also where forces are transmitted from the transfer device to the bending tool. This ensures a low-friction movement of the bending tool in the rail. Forces or moments acting transversely to the longitudinal extension of the rail can be minimized due to this feature of the invention. This prevents the bending tool from jamming inside the rail.

The coupling has a releasing (released) position and a coupling position and can be operated by means of an actuator. The coupling may be provided in the form of a mechanical coupling, magnetic coupling or a suction device, for example. The coupling may establish a frictional and/or positively fitting connection with the bending tool.

The actuator for operating the coupling may be a cylinder-piston unit, a linear drive, a motor, a vacuum system and/or an electromagnetic device.

The expression active area should be understood as meaning the area of the coupling that cooperates with the bending tool in the coupling position, i.e. comes into contact or engagement with the bending tool. The active area may be an active surface or contact surface on the coupling, e.g. gripping surfaces of a gripper lying on the bending tool.

A major advantage of the invention compared with the prior art outlined above is the fact that no separate rail or guide has to be provided for the transfer device, which significantly reduces the complexity of the construction. The bending tools inserted in the bending press and/or in the feeding device are held in the same rail as that in which the transfer device or a section of the transfer device is also inserted and held.

The principled proposed by the invention can be applied to both bending presses and feeding devices. However, bending presses could also have a driven transfer device—independently of the presence of a feeding device—which is used for pushing and exactly positioning a bending tool inside the tool holder. In the case of a combined arrangement, i.e. a feeding device coupled with a bending press, the bending tools can be pushed from the tool holder of the feeding device to the tool holder of the bending press and vice versa.

The bending press and/or feeding device preferably have a control device by means of which the operation of pushing, feeding and/or changing the tools is automated. For this purpose, the control device is connected to the coupling and/or to an actuator operating the coupling. The control device may also be connected to the (displacement) drive of the transfer device (and optionally other drives of the feeding device, e.g. for moving and displacing a bending tool storage which may optionally be provided).

In particular, the bending press may be a press for bending metal workpieces, in particular (steel) sheet metal.

One preferred embodiment is characterised by the fact that the active area of the coupling lies entirely inside the rail. Being accommodated entirely in the rail, the section of the coupling co-operating with the bending tool is afforded optimum protection whilst at the same time the transmission of force takes place at a conducive point which prevents the bending tool from jamming. Based on another embodiment, all of the moving sections of the coupling lying on the external face of the transfer device are disposed entirely inside the rail.

One preferred embodiment is characterised by the fact that the coupling extends in a region of the inner profile of the rail that is not completely filled by the bending tool. As a result, at least a section of the coupling can be moved laterally next to the bending tool. This offers the possibility of gripping the bending tool from opposite sides.

One preferred embodiment is characterised by the fact that at least one internal wall of the rail forms a guide structure extending in the longitudinal direction of the rail and the coupling—in at least one position—lies in the guide structure or extends into it. As a result, the transfer device and the coupling can be accommodated in the narrowest space. The guide structure provides a defined space for the coupling. In this respect, it would also be conceivable for the coupling to lie in the guide structure only when it is in the releasing or coupling position, or alternatively, the coupling extends into the guide structure in both the releasing and the coupling position.

One preferred embodiment is characterized by the fact that the bending tool is held in the rail by the same guide structure as that by which the transfer device (e.g. shuttle) is guided and/or into which the coupling extends. This is of particular advantage because a separate guide structure does not have to be provided for the transfer device and/or coupling. The bending tool is held by retaining means projecting out from the shaft of the bending tool for example, such as pegs, pins or bars. The retaining means extend into the guide structure, as a result of which the bending tool is held in the rail. The retaining means may also be displaceable and can be moved by an operating element of the bending tool (so-called safety pins) from a retaining into a releasing position, for example. This enables the bending tools to be inserted in a direction extending transversely to the longitudinal extension of the rail.

The guide structure in the rail may also be designed to hold the transfer device in the rail. In addition to providing the guiding function along the longitudinal extension of the rail, the guide structure provided inside the rail also fulfils a holding function for holding the transfer device in (or inside) the rail. The transfer device can be displaced along the guide structure (i.e. parallel with the longitudinal extension of the rail) and is held by the guide structure in the direction perpendicular to the longitudinal extension of the rail (i.e. in the direction from the rail interior towards the rail opening). The guide structure therefore prevents the transfer device from falling or jumping out of the rail.

It is particularly preferable if guide structures already existing inside the rail can be used to guide the transfer device and accommodate the coupling. This being the case, the principle proposed by the invention can also be used on existing machines without any or only slight modifications.

One preferred embodiment is characterized by the fact that the coupling is provided in the form of a mechanical gripper. A bending tool can therefore be reliably coupled with the transfer device. The operation of releasing the coupling is also straightforward; above all, the risk of the bending tool being left "hanging" on the transfer device is significantly reduced.

One preferred embodiment is characterized by the fact that the gripper comprises two gripping arms which preferably lie entirely inside the rail. The gripping arms and their mechanism are totally protected. The service life of the coupling can be significantly increased as a result.

In terms of their length, the gripping arms preferably extend substantially parallel with the longitudinal extension of the rail of the tool holder and/or the pivot axis of the gripping arms extends substantially perpendicular to the longitudinal extension of the rail and substantially parallel with the direction in which the rail opens.

One preferred embodiment is characterized by the fact that two oppositely lying internal walls of the rail respectively form at least one guide structure running along the longitudinal extension of the rail, preferably in the form of a groove, and—in at least one position of the coupling—one gripping arm extends through one guide structure and the other gripping arm extends through the oppositely lying guide structure. In this manner, a gripper system can be provided which requires a minimum amount of space. The bending tool is contacted by the gripping arms from both sides and held in a frictional grip. The guide structure in the internal wall affords sufficient space for the gripping movement.

One preferred embodiment is characterized by the fact that the bending tool is retained in the same guide structures as those in which the gripping arms also sit. This means that no additional guide structure has to be provided for the gripping arms and instead, use can be made of existing structures.

One preferred embodiment is characterized by the fact that the gripper is biased into an open position by means of a spring. The drive mechanism for the coupling therefore merely has to be capable of moving the gripper into the closed position, i.e. the position coupling the bending tool. As a result, the construction of the drive mechanism can be made much simpler.

One preferred embodiment is characterized by the fact that the gripping arms are respectively provided in the form of a lever and a displaceable, preferably wedge-shaped spreading device is provided between the levers, and the levers can be pushed apart from one another by a movement of the spreading device. The spreading device can preferably be moved in a direction substantially parallel with the longitudinal extension of the rail, thereby making optimum use of the available space.

One preferred embodiment is characterized by the fact that the lever portions which co-operate with the bending tool are shorter than the lever portions which co-operate with the spreading device. The lever portions should be viewed respectively from the pivotal point of the respective lever. As a result of this feature, the gripping force can be increased by the lever effect.

One preferred embodiment is characterized by the fact that the transfer device comprises a shuttle guided in the rail of the tool holder, in particular in the form of a slide or carriage, and the coupling is disposed on the shuttle. The shuttle provides a stable and protective platform for mounting the coupling and its drive mechanism.

One preferred embodiment is characterized by the fact that the coupling can be operated by an actuator preferably disposed in or on the shuttle, preferably a cylinder-piston unit.

One preferred embodiment is characterized by the fact that the shuttle has retaining elements which are guided by the same guide structure as that in which the coupling also extends. Here too, existing structures can be used to hold the shuttle.

One preferred embodiment is characterized by the fact that the transfer device comprises an elongate, preferably flexible, pull and/or push transmitting means, in particular a belt, a cable, a rod or a chain, and the shuttle is connected to the pull and/or push transmitting means. By using a pull and/or push transmitting means, the displacement drive of the transfer device can be disposed at a distance apart from the tool holders. The transfer device may therefore also be based on a lightweight and compact design. The transmission means may be designed to transmit pull forces or push forces or pull and push forces. If the bending tools are fed in or changed from only one end of the rail, a pull and push transmitting means is used.

Based on an alternative variant, the shuttle may also be of a self-propelling design, in which case the displacement drive is disposed in or on the shuttle. In this manner, the transfer device may be built with relatively few components. The shuttle may be activated by hard wiring or alternatively by radio.

One preferred embodiment is characterized by the fact that the pull and/or push transmitting means is guided by a guide structure formed by an internal wall of the rail, and the pull and/or push transmitting means is preferably guided in the same guide structure as that in which the coupling extends.

One preferred embodiment is characterized by the fact that a window is provided in the shuttle by means of which the position of the coupling can be seen from outside and/or by means of which the coupling can be operated by operating personnel. In the event of a fault in the system, an operator can immediately see the position of the coupling and initiate appropriate measures.

One preferred embodiment is characterized by a number of tool holders which form a bending tool storage, and the tool holders can preferably be moved individually or in a co-operating unit relative to the transfer device. Accordingly, different tool holders can be moved along or through by means of the same transfer device.

One preferred embodiment is characterized by the fact that the feeding device is a tool changer for changing one or more bending tools inserted in a bending press. Based on this variant, not only can the bending press be set up with bending tools, bending tools can also be returned (when no longer being used) from the bending press to the feeding device or tool changer. The tool changer is automated, i.e. connected to a control device which controls the displacement of the transfer device and/or operation of the coupling and optionally the movement of the bending tool storage relative to the transfer device.

One preferred embodiment is characterized by the fact that the bending tool storage is provided in the form of a shelf, a turntable, a transfer table, a drum, a paternoster elevator and/or one or more racks. Accordingly, a plurality of different bending tools can be made available and/or changed.

One preferred embodiment is characterized by at least two tool holders and one tool holder is the upper tool holder and the other tool holder is the lower tool holder.

The objective of the invention is also achieved by means of a method for setting up a bending press with bending tools and/or for changing one or more bending tools inserted in a bending press using a feeding device, whereby one or more bending tools are pushed by a transfer device between the tool holder of the feeding device and the tool holder of the bending press, characterized in that the bending press and/or the feeding device is/are as claimed above, and the transfer device together with the coupling is moved to a bending tool and the coupling is moved from a releasing position into a position coupling the bending tool.

The invention further relates to a an arrangement of a bending press and a feeding device for setting up the bending press with bending tools connected to it. The rail of the bending presses tool holder and the rail of the feeding device tool holder (connected to it) preferably have the same guide structure, preferably the same inner profile. The guide structure of the bending press rail merges—without any change in profile—into the guide structure of the feeding device rail, thereby providing friction-free transit for the transfer device.

The objective of the invention is also achieved by means of a bending tool transfer device for moving a bending tool in the tool holder of a bending press and/or a feeding device, preferably in the form of a shuttle, comprising:
 a guide part designed to be inserted in a rail of a tool holder having an inner profile; and
 a releasable coupling for connecting a bending tool, and the active area of the coupling lies at least partially, preferably completely, at the height of the guide part.

That part of the coupling constituting the active surface or contact surface (e.g. gripping surface)—i.e. designed to come into connect or engagement with the bending tool—is disposed on the guide part of the transfer device. When inserted in a rail of the tool holder, the active area of the coupling then lies—at least partially—inside the rail. The advantages of this and the following features were explained above; a description of these will therefore not be repeated.

The coupling is preferably provided in the form of a mechanical gripper.

The gripper preferably comprises two gripping arms which are preferably disposed on oppositely lying sides of the guide part.

The gripper is preferably biased into an open position by means of a spring.

The gripping arms are preferably provided in the form of a lever in each case and a displaceable, preferably wedge-shaped spreading device is provided between the levers, and the levers can be pushed apart from one another by a movement of the spreading device.

Those lever portions which co-operate with the bending tool are preferably shorter than the lever portions which co-operate with the spreading device.

One preferred embodiment is characterized by the fact that the coupling can be operated by an actuator disposed in or on the transfer device, preferably a cylinder-piston unit, and the actuator is preferably disposed outside the guide part. By "outside" in this context is meant that the actuator can be disposed underneath the guide part (in the case of an upper tool holder) or above it (in the case of a lower tool holder). Naturally, the actuator may be disposed inside a body constituting the shuttle.

One preferred embodiment is characterized by the fact that the guide part has at least one laterally projecting retaining element to be retained in a rail of a tool holder and the coupling and/or the active area of the coupling is disposed at the same height as the retaining element.

As a result, the coupling and retaining elements can be guided and accommodated in the same guide structure of the rail.

To provide a clearer understanding, the invention will be described in more detail below with reference to the appended drawings.

Figure 11:
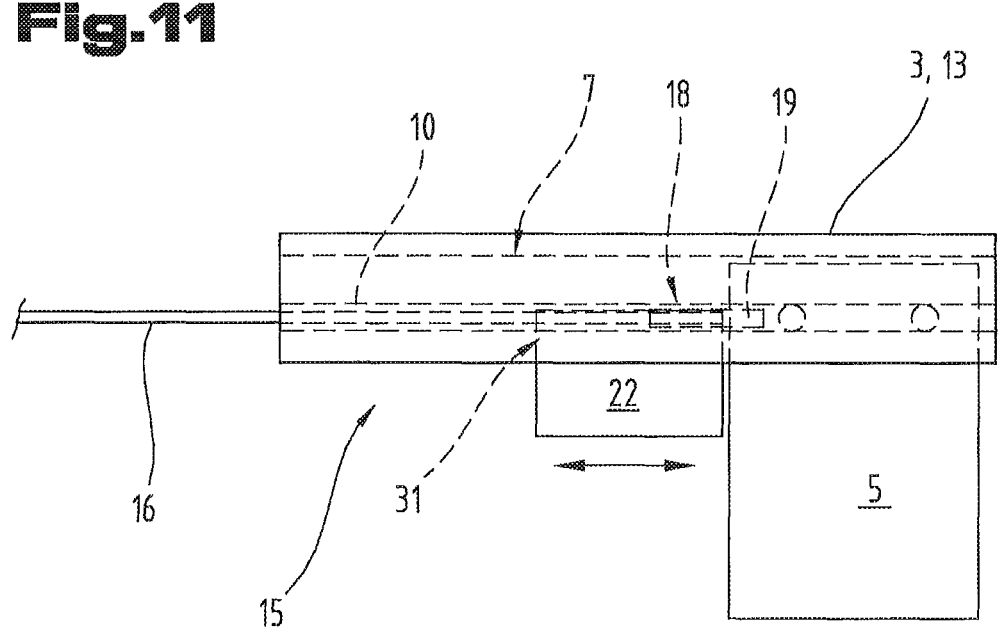

These are highly simplified, schematic diagrams illustrating the following:

FIG. 1 a bending press;

FIG. 2 an arrangement comprising a bending press and a feeding device;

FIG. 3 a bending tool and a transfer device in the form of a shuttle with a coupling;

FIG. 4 a tool holder with inserted bending tool and transfer device;

FIG. 5 a perspective view of the tool holder from FIG. 2;

FIG. 6 a view into the interior of the transfer device from FIG. 1;

FIG. 7 a rail inner profile with a coupling disposed therein;

FIG. 8 another variant of a rail inner profile;

FIG. 9 another variant of a rail inner profile;

FIG. 10 the position of a pull and/or push transmitting means inside the rail;

FIG. 11 a transfer device extending in the upper tool holder comprising pull and/or push transmitting means and a shuttle, which is coupled with an upper tool by means of a coupling.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

The embodiments illustrated as examples represent possible variants of the bending press and feeding device, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

Above all, the individual embodiments of the subject matter illustrated in the drawings constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the bending press and feeding device, they and their constituent parts are illustrated to a certain extent out of scale and/or on an enlarged scale and/or on a reduced scale.

FIG. 1 illustrates a bending press 1 and it should be pointed out at this stage that a feeding device 2 (FIG. 2) for setting up a bending press 1 with bending tools 5, 6 may likewise be provided and the following explanations may likewise apply to a feeding device 2—at least insofar as the inventive features are concerned.

FIG. 2 illustrates an arrangement comprising a bending press 1 and a feeding device 2 coupled with it for setting up the bending press 1 with bending tools 5, 6. FIG. 2 illustrates a number of tool holders 13, 14 which form a bending tool storage 23 of the feeding device 2. As indicated by the double arrow, the tool holders 13, 14 can be moved individually or in a co-operating unit relative to the transfer device 15 so that a transfer device 15 is able to move into different tool holders and move the bending tools stored there into the bending press 1. The feeding device 2 in this instance is a tool changer for changing one or more bending tools 5, 6 inserted in a bending press 1. The bending tool storage 23 may be provided in the form of a shelf, a turntable, a transfer table, a drum, a paternoster elevator and/or one or more racks.

As may be seen from the drawings, the bending press 1 and/or feeding device 2 comprises at least two tool holders 3, 4 respectively 13, 14, and one tool holder 3 respectively 13 is the upper tool holder and the other tool holder 4 respectively 14 is the lower tool holder.

The bending press 1 and/or feeding device 2 illustrated in FIG. 2 comprises at least two transfer devices 15 which can preferably be activated independently of one another, one transfer device 15 co-operating with the upper tool holder 3 respectively 13 and one transfer device 15 co-operating with the lower tool holder 4 respectively 14.

As may be seen from FIG. 1 or 2 in combination with FIG. 4, the bending press 1 and/or feeding device 2 comprises at least one tool holder 3, 4 respectively 13, 14 with a rail 7 having an inner profile 8 for receiving and displacing a bending tool 5, 6.

A transfer device 15 displaceable along the longitudinal extension of the rail 7 by means of a drive 21 (FIG. 2) is used to move a bending tool 5, 6 inside the tool holder 3, 4 respectively 13, 14 and/or between the tool holder 13, 14 of the feeding device 2 and a tool holder 3, 4 of the bending press 1.

FIGS. 3 to 6 illustrate a transfer device 15 with a releasable coupling 18 for connecting to a bending tool 5 (in this instance: an upper tool). The transfer device 15 is guided in the rail 7 of the tool holder 3, 4 respectively 13, 14. The active area of the coupling 18 lies at least partially inside the rail 7. In the embodiment illustrated, the active area of the coupling 18 lies completely inside the rail 7. The active area is that area of the releasable coupling 18 which cooperates with the bending tool 5 in the coupling position, i.e. comes into contact or engagement with the bending tool. The active area is formed by at least one active surface or contact surface (in this instance: the gripping surfaces of a gripper) which lie on the bending tool in the coupling position.

The bending tool transfer device 15 in FIG. 3 has a guide part 31 which is designed to be inserted in the rail 7. The active area of the coupling 18 lies at least partially, preferably entirely, at the height of the guide part 31. When the transfer device 15 is inserted in the rail 7, the active area lies (at least partially) inside the rail 7. The gripping arms 19 are disposed on oppositely lying sides of the guide part 31. The guide part 31 has laterally projecting retaining elements 20 for holding the transfer device inside the rail 7. The coupling 18 and/or the active area of the coupling 18 are disposed on the guide part 31 at the same height as the retaining element 20.

An actuator 24 (FIG. 6) provided as a means of operating the coupling 18 is disposed not inside but outside (in this instance: underneath) the guide part 31—in particular for reasons of space.

The principle behind this embodiment may be seen particularly clearly in FIG. 11. The guide structure 10 in the form of a groove in the internal wall of the rail 7 holds the transfer device 15, in particular the shuttle 22, as well as the bending tool 5. The coupling 18 likewise extends through the guide structure 10—in this instance by means of its gripping arms 19.

In the embodiment illustrated, the coupling 18 is provided in the form of a mechanical gripper with two gripping arms. As may be seen from FIG. 4, the gripping arms lie entirely inside the rail 7. The coupling 18 formed by the gripping arms 19 extends in a region of the inner profile 8 of the rail 7 which is not completely filled by the bending tool 5, 6. As may also be seen, at least one internal wall 9 of the rail 7 forms a guide structure 10 extending in the longitudinal direction of the rail 7 and the coupling 18 lies in the guide structure 10 or projects into the guide structure 10 by means of its gripping arms 19—at least in one position.

In this specific embodiment, two oppositely lying internal walls 9 of the rail 7 respectively form at least one guide structure 10 in the form of a groove running along the longitudinal extension of the rail 7, and—in at least one position of the coupling 18—one gripping arm 19 extends in one guide structure 10 and the other gripping arm 19 extends in the oppositely lying guide structure 10. In terms of their length, the gripping arms 19 extend substantially parallel with the longitudinal extension of the rail 7. The pivot axes of the gripping arms 19 sit substantially perpendicular to the longitudinal extension of the rail 7 and substantially parallel with the direction in which the rail 7 opens.

In addition to the position of the gripping arms 19 in the grooves, FIG. 7 illustrates a clamping device 11 with discrete clamping elements 12. Operation of the clamping device 11 will be described in more detail with reference to FIG. 8. Reference 17 denotes the rail opening.

In FIG. 8, the die guide structure 10 is provided in the form of discrete guide elements which project from an internal wall 9 into the interior of the rail 7 and are distributed in the longitudinal direction of the rail 7. In the embodiment illustrated, the bending press 1 and/or the feeding device 2 has a clamping device 11 for clamping the bending tool 5, 6 in the rail 7. The discrete guide elements are provided in the form of drivable clamping elements 12 of the clamping device 11. The clamping elements 12 can be moved from a releasing (i.e. retracted) position into a position clamping the bending tool (i.e. extracted), e.g. by means of a pressure-transmitting device (based on a cylinder and piston design in FIG. 8). The coupling 18 and/or a gripping arm 19 may be guided by these clamping elements 12 and/or may extend above the clamping elements 12.

In FIG. 9, the guide structure 10 is provided in the form of a wedge-shaped portion of the inner profile 8 of the rail 7. The coupling 18 respectively the gripping arms 19 lie on the wedge-shaped portion and/or extend above the wedge-shaped portion.

The bending tool 5 may be retained in the same guide structure 10 as that in which a gripping arm 19 also sits. The bending tool is retained, for example, by means of the retaining means projecting out from the shaft of the bending tool, e.g. pegs, pins or bars. The retaining means extend into the guide structure so that the bending tool is held in the rail. The retaining means may also be displaceable, in which case they are moved from a holding position into a releasing position by means of an operating element of the bending tool (so-called safety pins), for example.

As mentioned above, the transfer device 15 may be provided in the form of a shuttle 22 guided in the rail 7 of the tool holders 3, 4 respectively 13, 14, in particular in the form of a slide or carriage (FIGS. 3 to 6). The coupling 18 in this instance is provided on the shuttle 22. The shuttle 22 illustrated in FIG. 3 has retaining elements 20 which sit at the same height as the coupling 18 and are therefore guided by the same guide structure 10 as that in which the coupling 18 also extends.

A window 28 may be provided in the shuttle 22 by means of which the position of the coupling 18 can be seen from outside and/or by means of which the coupling 18 can be operated by operating personnel.

FIG. 6 illustrates the inner workings of the shuttle 22, in particular an actuator 24 in the form of a cylinder-piston unit for operating the coupling 18. The actuator 24 acts via a rod 25 with a co-operating spreading device 26 which can be displaced (in the longitudinal direction of the rail 7). The shuttle 22 also has a connector 30 for a pressurizing medium line. Alternatively or in addition, the shuttle may also have an electrical connector. The (electrical or pressurizing medium) line may extend and/or be retained in or on an elongate pull and/or push transmitting means 16.

The gripping arms 19 are provided in the form of a lever in each case. Disposed between the levers is a wedge-shaped portion of the spreading device 26. A movement of the spreading device 26 in the direction of the front portion of the gripping arms 19 pushes the rear lever portions apart from one another. As a result, the front portions of the lever incorporating the gripping surface move towards one another, thereby gripping and/or frictionally coupling the bending tool.

The lever portions which co-operate with the bending tool 5 (i.e. forming the gripping surface) are shorter than the lever portions co-operating with the spreading device 26. The gripper in FIG. 6 is biased into an open position by means of a spring 27.

As illustrated in FIG. 11, the transfer device 15 may also comprise an elongate, preferably flexible, pull and/or push transmitting means 16, in particular a belt, a cable, a rod or a chain. The shuttle 22 is connected to the pull and/or push transmitting means 16. To this end, the shuttle 22 may be provided with a connecting means 29 (FIG. 3).

FIG. 10 in combination with FIG. 7 illustrate how it is possible for the pull and/or push transmitting means 16 to be guided in the same guide structure 10 as that in which the coupling 18 extends.

The method for setting up a bending press 1 with bending tools 5, 6 and/or for changing one or more bending tools 5, 6 inserted in a bending press 1 using a feeding device 2 may be implemented as follows: the transfer device 15 with the coupling 18 is moved to a bending tool 5, 6. The coupling 18 is moved from a releasing position into a position coupling the bending tool 5, 6. One or more bending tools 5, 6 is or are then moved by the transfer device 15 between the tool holder 13, 14 of the feeding device 2 and the tool holder 3, 4 of the bending press 1. The direction of movement of the transfer device 15 is indicated by a double arrow in FIG. 11.

LIST OF REFERENCE NUMBERS

| | |
|---|---|
| 1 | Bending press |
| 2 | Feeding device |
| 3 | Tool holder |
| 4 | Tool holder |
| 5 | Bending tool (upper tool) |
| 6 | Bending tool (lower tool) |
| 7 | Rail |
| 8 | Inner profile |
| 9 | Internal wall |
| 10 | Guide structure |
| 11 | Clamping device |
| 12 | Clamping element |
| 13 | Tool holder |
| 14 | Tool holder |
| 15 | Transfer device |
| 16 | Pull and/or push transmitting means |
| 17 | Rail opening |
| 18 | Coupling |
| 19 | Gripping arm |
| 20 | Retaining element |
| 21 | Drive |
| 22 | Shuttle |
| 23 | Bending tool storage |
| 24 | Actuator |
| 25 | Rod |
| 26 | Spreading device |
| 27 | Spring |
| 28 | Window |
| 29 | Connecting means |
| 30 | Connector |
| 31 | Guide part |

The invention claimed is:

1. A device comprising:
    at least one first tool holder with a rail comprising an inner profile for receiving and displacing a bending tool; and
    at least one transfer device comprising a releasable coupling for connecting to the bending tool; and
    a drive configured to drive the at least one transfer device;
    wherein the transfer device is guided in the rail of the first tool holder and an active area of the coupling is arranged at least partially inside the rail, and
    wherein the releasable coupling comprises a mechanical gripper.

2. The device according to claim 1, wherein the active area of the coupling lies entirely inside the rail.

3. The device according to claim 1, wherein the coupling extends in a region of the inner profile of the rail that is not completely filled by the bending tool.

4. The device according to claim 1, wherein at least one internal wall of the rail forms a guide structure extending in the longitudinal direction of the rail and the coupling, in at least one position of the coupling, lies in the guide structure or extends into the guide structure.

5. The device according to claim 1, wherein the gripper comprises two gripping arms.

6. The device according to claim 5, wherein a first internal wall of the rail forms a first guide structure running along the longitudinal extension of the rail,
    wherein a second internal wall of the rail lies opposite from the first internal wall of the rail and forms a second guide structure running along the longitudinal extension of the rail, and
    wherein in at least one position of the coupling a first gripping arm of the two gripping arms extends through the first guide structure and a second gripping arm of the two gripping arms extends through the second guide structure.

7. The device according to claim 6, wherein the bending tool is retained in the first guide structure when the first gripping arm sits in the first guide structure.

8. The device according to claim 1, wherein the gripper is biased into an open position via a spring.

9. The device according to claim 5, wherein the first gripping arm comprises a first lever,
    wherein the second gripping arm comprises a second lever, and
    wherein a displaceable spreading device is provided between the first and the second levers, and the first and the second levers can be pushed apart from one another by a movement of the spreading device.

10. The device according to claim 9, wherein first lever portions of the first and the second levers co-operate with the bending tool,
    wherein second lever portions of the first and the second levers co-operate with the spreading device, and wherein the first lever portions are shorter than the second lever portions.

11. The device according to claim 1, wherein the transfer device further comprises a shuttle guided in the rail of the first tool holder, and
wherein the coupling is disposed on the shuttle.

12. The device according to claim 11, wherein the transfer device further comprises an actuator configured to operate the coupling.

13. The device according to claim 11, wherein a first internal wall of the rail forms a first guide structure running along the longitudinal extension of the rail, and
wherein the shuttle has retaining elements which are guided by the first guide structure when the coupling extends in the first guide structure.

14. The device according to claim 11, wherein the transfer device further comprises an elongate pull and/or push transmitter, and
wherein the shuttle is connected to the pull and/or push transmitter.

15. The device according to claim 14, wherein the pull and/or push transmitter is guided by a guide structure formed by an internal wall of the rail.

16. The device according to claim 11, wherein a window is provided in the shuttle, and
wherein via the window a position of the coupling can be seen from outside and/or via the window the coupling can be operated by an operator.

17. The device according to claim 1, further comprising a second tool holder,
wherein the first tool holder and the second tool holder form a bending tool storage, and
wherein the first and the second tool holders can be moved individually or in a co-operating unit relative to the transfer device.

18. A method comprising:
providing a device according to claim 1,
moving the transfer device to the first bending tool of the device,
moving the releasable coupling from a releasing position into a coupling position, wherein the gripper couples the first bending tool in the coupling position, and
displacing the first bending tool via the transfer device between the first tool holder of the device and a tool holder of another device.

19. An arrangement comprising:
a bending press, and
a feeding device connected to the bending press for setting up the bending press with bending tools,
wherein at least one of the bending press and the feeding device is a device according to claim 1.

20. The device according to claim 1, wherein the device is a feeding device for setting up a bending press with bending tools.

21. A bending tool transfer device for moving a bending tool, the bending tool transfer device comprising:
a guide part designed to be inserted in a rail of a tool holder having an inner profile;
a releasable coupling for connecting a bending tool; and
a drive for moving the transfer device along a longitudinal extension of the rail;
wherein an active area of the releasable coupling lies at least partially at a height of the guide part, and
wherein the releasable coupling comprises a mechanical gripper.

22. The bending tool transfer device according to claim 21, wherein the gripper comprises two gripping arms.

23. The bending tool transfer device according to claim 21, wherein the gripper is biased into an open position via a spring.

24. The bending tool transfer device according to claim 22, further comprising a displaceable spreading device,
wherein a first gripping arm of the two gripping arms comprises a first lever,
wherein a second gripping arm of the two gripping arms comprises a second lever, and
wherein the displaceable spreading device is provided between the first and the second levers, and
wherein the first and the second levers can be pushed apart from one another by a movement of the spreading device.

25. The bending tool transfer device according to claim 24, wherein first lever portions of the first and the second levers co-operate with the bending tool,
wherein second lever portions of the first and the second levers co-operate with the spreading device, and
wherein the first lever portions are shorter than the second lever portions.

26. The bending tool transfer device according to claim 21, further comprising an actuator configured to operate the coupling.

27. The bending tool transfer device according to claim 21, wherein the guide part has at least one laterally projecting retaining element to be retained in the rail of the tool holder, and
wherein the releasable coupling and/or the active area of the releasable coupling is disposed at the same height as the at least one laterally projecting retaining element.

28. A device comprising:
at least one first tool holder with a rail comprising an inner profile for receiving and displacing a bending tool; and
at least one transfer device comprising a releasable coupling for connecting to the bending tool; and
a drive configured to drive the at least one transfer device;
wherein the transfer device is guided in the rail of the first tool holder and an active area of the coupling is arranged at least partially inside the rail, and
wherein the releasable coupling comprises a magnetic coupling or a suction device.

29. A device comprising:
at least one first tool holder with a rail comprising an inner profile for receiving and displacing a bending tool; and
at least one transfer device comprising:
a releasable coupling for connecting to the bending tool,
a shuttle, and
an actuator configured to operate the releasable coupling between a releasing state and a coupling state; and
a drive configured to drive the at least one transfer device;
wherein the shuttle is guided in the rail of the first tool holder and an active area of the coupling is arranged at least partially inside the rail;
wherein the releasable coupling is disposed on the shuttle and comprises a mechanical gripper;
wherein the actuator is disposed in or on the shuttle; and
wherein the shuttle is displaceable along a longitudinal extension of the rail via the drive.

30. A method comprising:
providing a device according to claim 29,
moving the transfer device to the first bending tool of the device, moving the releasable coupling from a releasing position into a coupling position, wherein the releasable coupling couples the first bending tool in the coupling position, and displacing the first bending tool via the transfer device between the first tool holder of the and a tool holder of another device.

31. An arrangement comprising:

a bending press, and a feeding device connected to the bending press for setting up the bending press with bending tools, wherein at least one of the bending press and the feeding device is a device according to claim 29.

32. A bending tool transfer device for moving a bending tool, the bending tool transfer device comprising:

a guide part designed to be inserted in a rail of a tool holder having an inner profile;

a releasable coupling for connecting a bending tool, the releasable coupling comprising an active area and a mechanical gripper;

a drive for moving the transfer device along a longitudinal extension of the rail;

a shuttle configured to be displaceable along the longitudinal extension of the rail via the drive; and an actuator configured to operate the releasable coupling between a releasing state and a coupling state;

wherein the active area of the releasable coupling lies at least partially at a height of the guide part;

wherein the releasable coupling is disposed on the shuttle; and wherein the actuator is disposed in or on the shuttle.

* * * * *